United States Patent [19]

Yamada et al.

[11] 4,139,289
[45] Feb. 13, 1979

[54] EXPOSURE COMPUTATION CIRCUIT

[75] Inventors: Sadao Yamada; Isao Arita, both of Kawasaki; Tadashi Ito, Yokohama; Soichi Nakamoto, Machida, all of Japan

[73] Assignees: Canon Kabushiki Kaisha; Tokyo Shibaura Electric Co., Ltd., both of Kanagawa, Japan

[21] Appl. No.: 746,205

[22] Filed: Dec. 1, 1976

Related U.S. Application Data

[63] Continuation of Ser. No. 521,876, Nov. 7, 1974, abandoned.

[30] Foreign Application Priority Data

Nov. 8, 1973 [JP] Japan .................................. 48-125735
Nov. 15, 1973 [JP] Japan .................................. 48-128652

[51] Int. Cl.² .............................................. G03B 7/08
[52] U.S. Cl. .................................. 354/23 D; 354/24; 354/50; 354/60 A
[58] Field of Search ................... 354/23 D, 24, 50, 51, 354/60 A

[56] References Cited

U.S. PATENT DOCUMENTS

| 3,748,979 | 7/1973 | Wada | 354/23 D |
| 3,827,065 | 7/1974 | Wada | 354/51 |
| 3,849,786 | 11/1974 | Nanba et al. | 354/51 |
| 3,852,774 | 12/1974 | Taguchi et al. | 354/51 |
| 3,863,263 | 1/1975 | Itagaki | 354/24 |

Primary Examiner—Russell E. Adams
Attorney, Agent, or Firm—Toren, McGeady and Stanger

[57] ABSTRACT

The present invention relates to an exposure computation circuit by means of which a computation is carried out with the values inversely proportional to all the exposure factors excepting the diaphragm value of the APEX system so as to obtain computation results in proportional relation with the actual shutter time value or the actual diaphragm value in order to control the exposure basing upon the computation results.

6 Claims, 10 Drawing Figures

FIG.1

| SHUTTER | | DIAPHRAGM | | ASA | | LUMINANCE | | | ILLUMINATION | | | EXPOSURE | |
|---|---|---|---|---|---|---|---|---|---|---|---|---|---|
| T | Tv | A | Av | Su | Sv | B | Bo | Bv | I | Iv | A²/T | Ev |
| 1 | 0 | 1 | 0 | 3 | 0 | 1 | 0.32 | 0 | 6 | 0 | 1 | 0 |
| 1/2 | 1 | 1.4 | 1 | 6 | 1 | 2 | 0.64 | 1 | 12 | 1 | 2 | 1 |
| 1/4 | 2 | 2 | 2 | 12 | 2 | 4 | 1.25 | 2 | 25 | 2 | 4 | 2 |
| 1/8 | 3 | 2.8 | 3 | 25 | 3 | 8 | 2.50 | 3 | 50 | 3 | 8 | 3 |
| 1/16 | 4 | 4 | 4 | 50 | 4 | 16 | 5.0 | 4 | 100 | 4 | 16 | 4 |
| 1/32 | 5 | 5.6 | 5 | 100 | 5 | 32 | 10 | 5 | 200 | 5 | 32 | 5 |
| 1/65 | 6 | 8 | 6 | 200 | 6 | 64 | 20 | 6 | 400 | 6 | 64 | 6 |
| 1/125 | 7 | 11 | 7 | 400 | 7 | 125 | 40 | 7 | 800 | 7 | 125 | 7 |
| 1/250 | 8 | 16 | 8 | 800 | 8 | 250 | 80 | 8 | 1600 | 8 | 250 | 8 |
| 1/500 | 9 | 22 | 9 | 1600 | 9 | 500 | 160 | 9 | 3200 | 9 | 500 | 9 |
| 1/1000 | 10 | 32 | 10 | 3200 | 10 | 1000 | 320 | 10 | 6400 | 10 | 1000 | 10 |
| | | | | 6400 | 11 | 2000 | 640 | 11 | 12500 | 11 | 2000 | 11 |
| | | | | 12800 | 12 | 4000 | 1250 | 12 | 25000 | 12 | 4000 | 12 |
| | | | | | | | | | | | 8000 | 13 |
| | | | | | | | | | | | 16000 | 14 |
| | | | | | | | | | | | 32000 | 15 |
| | | | | | | | | | | | 64000 | 16 |
| | | | | | | | | | | | 125000 | 17 |

| SHUTTER | | DIAPHRAGM | ASA | | LUMINANCE | | EXPOSURE | |
|---|---|---|---|---|---|---|---|---|
| Tv | Tv' | Av | Sv | Sv' | Bv | Bv' | Ev | Ev' |
| -3 | 29 | 0 | 2 | 10 | -6 | 20 | -1 | 27 |
| -2 | 28 | 1 | 3 | 9 | -5 | 19 | 0 | 26 |
| -1 | 27 | 2 | 4 | 8 | -4 | 18 | 1 | 25 |
| 0 | 26 | 3 | 5 | 7 | -3 | 17 | 2 | 24 |
| 1 | 25 | 4 | 6 | 6 | -2 | 16 | 3 | 23 |
| 2 | 24 | 5 | 7 | 5 | -1 | 15 | 4 | 22 |
| 3 | 23 | 6 | 8 | 4 | 0 | 14 | 5 | 21 |
| 4 | 22 | 7 | 9 | 3 | 1 | 13 | 6 | 20 |
| 5 | 21 | 8 | 10 | 2 | 2 | 12 | 7 | 19 |
| 6 | 20 | 9 | 11 | 1 | 3 | 11 | 8 | 18 |
| 7 | 19 | 10 | | | 4 | 10 | 9 | 17 |
| 8 | 18 | | | | 5 | 9 | 10 | 16 |
| 9 | 17 | | | | 6 | 8 | 11 | 15 |
| 10 | 16 | | | | 7 | 7 | 12 | 14 |
| | | | | | 8 | 6 | 13 | 13 |
| | | | | | 9 | 5 | 14 | 12 |
| | | | | | 10 | 4 | 15 | 11 |
| | | | | | 11 | 3 | 16 | 10 |
| | | | | | 12 | 2 | 17 | 9 |
| | | | | | 13 | 1 | 18 | 8 |

FIG.6

| SHUTTER-SPEED | COMPUTATION PULSE | PULSE NUMBER FOR SHUTTER SPEED ※ |
|---|---|---|
| 1/500 | 1 | 40 |
| 1/350 | 2 | 57 |
| 1/250 | 3 | 80 |
| 1/175 | 4 | 114 |
| 1/125 | 5 | 160 |
| 1/90 | 6 | 228 |
| 1/60 | 7 | 332 |

※ NOTE : STANDARD PULSE CYCLE: 50μs

FIG. 7a

| SHUTTER SPEED INDICATION | NUMBER | SHUTTER TIME (S) | REQUIRED STANDARD PULSE NUMBER OF 40KHz | COMPUTATING COUNTER | | | | | SHUTTER TIME COUNTER | | | | | | | | | | | | | | | | | | |
|---|---|---|---|---|---|---|---|---|---|---|---|---|---|---|---|---|---|---|---|---|---|---|---|---|---|---|---|
| | | | | 1 | 2 | 4 | 8 | 16 | 1 | 2 | 4 | 8 | 16 | 32 | 64 | 128 | 256 | 512 | 1024 | 2048 | 4096 | 8192 | 16384 | 32768 | 65536 | 131072 | 262144 |
| 1/2000 | 1 | 500μ | 20 | O | | | | | | | O | | O | | | | | | | | | | | | | | |
| 1/1400 | 2 | 710μ | 28 | | O | | | | | | O | O | O | | | | | | | | | | | | | | |
| 1/1000 | 3 | 1m | 40 | O | O | | | | O | | | O | | O | | | | | | | | | | | | | | |
| 1/700 | 4 | 1.4 | 57 | | | O | | | | | | O | O | O | | | | | | | | | | | | | | |
| 1/500 | 5 | 2. | 80 | O | | O | | | | O | | | O | O | | | | | | | | | | | | | | |
| 1/350 | 6 | 2.8 | 113 | | O | O | | | | | | | O | O | O | | | | | | | | | | | | | |
| 1/250 | 7 | 4. | 160 | O | O | O | | | | | | | | O | O | O | | | | | | | | | | | | |
| 1/175 | 8 | 5.6 | 226 | | | | O | | | O | | | | O | O | O | | | | | | | | | | | | |

FIG. 7b

| | | | |
|---|---|---|---|
| 1/125 | 9 | 8. | 320 |
| 1/90 | 10 | 11.3 | 451 |
| 1/60 | 11 | 16. | 640 |
| 1/45 | 12 | 22.6 | 902 |
| 1/32 | 13 | 32. | 1280 |
| 1/22 | 14 | 45.1 | 1805 |
| 1/16 | 15 | 64. | 2560 |
| 1/11 | 16 | 90.2 | 3610 |
| 1/8 | 17 | 128. | 5120 |
| 1/5.6 | 18 | 180.5 | 7220 |
| 1/4 | 19 | 256. | 10240 |
| 1/2.8 | 20 | 361. | 14440 |
| 1/2 | 21 | 512. | 20480 |
| 1/1.4 | 22 | 721.9 | 28880 |
| 1 | 23 | 1024. | 40960 |
| 1.4 | 24 | 1443.8 | 57760 |
| 2 | 25 | 2048. | 81920 |
| 2.8 | 26 | 2887.8 | 115520 |
| 4 | 27 | 4096. | 163840 |
| 5.6 | 28 | 5775.6 | 231040 |
| 8 | 29 | 8192. | 327680 |

EXPOSURE COMPUTATION CIRCUIT

This is a continuation of Application Ser. No. 521,876 filed on Nov. 7. 1974 now abandoned.

DETAILED EXPLANATION OF THE INVENTION

1. Field of the Invention

The present invention relates to an exposure control circuit, especially an improved exposure control circuit of the APEX exposure system.

2. Description of the Prior Art

So far the APEX system has been proposed in order to treat the exposure of the camera. According to this APEX system all the numerical values concerning the exposure are converted into simple numbers in such a manner that the exposure quantity is represented as the sum of the above mentioned numbers. Hereby the exposure quantity (Ev), the time value (Tv), the diaphragm value (Av), the ASA value (Sv), the luminance value (Bv) and the illumination value (Iv) are represented in the exponent of 2 whereby it can be defined in such a manner that Ev is equal to $$\{\frac{\text{diaphragm value }(A)}{\text{shutter time in sec. }(T)}\}^2, Tv\frac{1}{\text{shutter time in sec. }(T)},$$

Av (diaphragm(A) $)^2$, Sv a number proportional to ASA value, Bv a value proportional to luminance ($B_{fL}$ or $B_{e}$ai/ft$^2$ and Iv a value proportional to illumination.

However the above mentioned system is not utilized so much in the practice, whereby only Ev (Exposure quantity) is used. One of the reasons seems to be that the system serves nothing but as an equation merely for calculation in practice and there take place irrational points when considered in connection with the mechanism and the efficiency of the camera so that its application is difficult.

For example according to the shutter time in the table of FIG. 1, the Tv value for 1/1000 sec. is 10 and that for 1 sec. 1 while those for the time more than one second are negative. Besides Tv assumes a value inversely proportional to the time length so that it is unnatural and inconvenient for the actual application. On the other hand is the larger the Tv value is the larger the diaphragm value is. In consequence, it is impossible to assume values inversely proportional to both of them, being connected with the exposure. In consequence, in case the shutter time is controlled with shutter in priority by means of the exposure control circuit of the above mentioned APEX system, for the same luminance of an object to be photographed, the Tv value which represents the shutter time value when a large value is assumed for the diaphragm is smaller than the Tv value when a small value is assumed for the diaphragm, which is quite contrary to the relation of the actual shutter time value. Further the result of the case with shutter time in priority is same as that with diaphragm in priority, whereby it is inconvenient to offer an actual exposure control circuit because it is unavoidable that the disposition of the circuit becomes complicated.

Further in case the exposure is controlled in a digital way by applying the conventional APEX system it is impossible to use as control pulse, the pulse which corresponds to the actual shutter time or the actual diaphragm in order to control the shutter speed or the diaphragm because as explained above, the results of the exposure computation for the shutter speed value or the diaphragm value assume a relation inversely proportional to the actual shutter time value or the actual diaphragm value whereby it becomes unavoidable to adopt the digital control system according to;

(1) the actual time compression elongation system which adopts a binary circuit such as flip-flop became the system of the shutter speed and other mechanism of camera is of $2^n$ series and has much to do with the binary system, or (2) logarithmic compression inverse logarithmic elongation system according to which the input is compressed logarithmically while the output is elongated in an inverse logarithmically whereby the computation between the compression and the elongation is carried out in a digital way.

However, according to the system (1), the compression is necessary because it takes much time to carry out the computation with the actual time value, when the shutter speed is low, while when the shutter speed is high, the upper limit of the compression is limited, being connected with the upper limit of the frequency characteristics of the circuit and further the power consumption is increased proportionally to the increase of the frequency due to the low power consumption even when a complementary MOS.IC is used, which also brings about a restriction. Further, it is inconvenient that the conversion of the system can not be done freely.

On the other hand, according to the system (2), the restriction on the frequency can profitably be avoided while the possibility that the errors should be introduced in the conversion circuit is increased so as to reduce the accuracy because the conversion is carried out two times, namely the logarithmic compression and the inverse logarithmic elongation. Further, if the accuracy is tried to be increased, the device becomes complicated and expensive, which is inconvenient for the exposure control circuit of the camera.

SUMMARY OF THE PRESENT INVENTION

A purpose of the present invention is to offer an exposure computation circuit in which the exposure factors such as the shutter speed, the diaphragm value and so on can be computed as the values corresponding to the actual numerical values.

Another purpose of the present invention is to offer a digital exposure computing circuit in which the input is analog-digitally converted and logarithmically compressed in such a manner that the figures to be computed is reduced, so that the computation is carried out with reduced figures, the actual time is treated when the result is enlarged into time, whereby the time is directly given digitally without any digital-analog conversion.

Another purpose of the present invention is to offer a digital exposure computation circuit which can be manufactured at low cost.

A still further purpose of the present invention is to offer a digital exposure computation circuit whose circuit composition is simple and whose operation is correct.

Further purposes of the present invention will become clear from the following explanation referring to the embodiments of the present invention.

BRIEF DESCRIPTION OF THE DRAWINGS

FIG. 1 shows the table of camera index according to the APEX system.

FIG. 2 shows the table of camera index according to the present invention, shown in comparison with that according to the APEX system.

FIG. 6 shows a table of the shutter speed, the computation pulse and the pulse number for shutter speed for explaining embodiments.

FIGS. 7a and b show a table of the computation counter indication and the shutter time counter indication for a wide range of the shutter speed.

Figure 3:
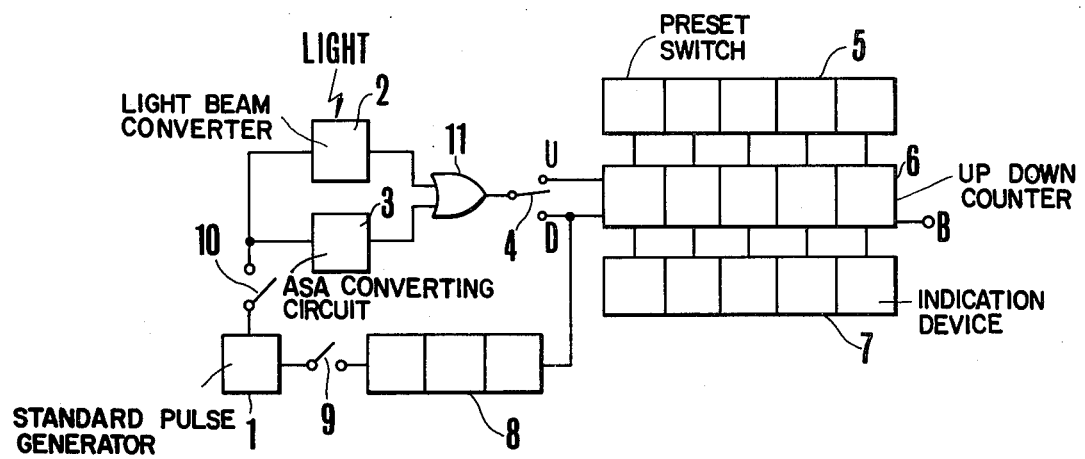
FIG. 3 shows a block diagram of a circuit as one embodiment of the present invention.

DESCRIPTION OF THE PREFERRED EMBODIMENT:

FIG. 1 shows a table of the camera index according to the APEX system showing the numerical values of the exposure factor according to the APEX system in comparison with the numerical values of the actual exposure factor, whereby the exposure (Ev), the shutter time (Tv), the diaphragm (Av), the ASA (Sv) and the luminance (Bv) are indicated in the power index of 2 and also in $$\left\{ \frac{\text{Diaphragm value } (A)}{\text{Shutter time in sec. } (T)} \right\}^2, \frac{1}{\text{Shutter time in sec. } (T)},$$

{Diaphragm value (A) }$^2$, a value proportional to ASA value, a value proportional to luminance ($B_{fL}$ or $B_e$ ai/ft$^2$) and a value proportional to illumination (fc). Hereby the relation according to APEX is fulfilled as follows.

Ev = Av + Tv
= Bv + Sv
= Iv + Sv.

FIG. 2 shows a table of the exposure factor index according to the present invention, shown in comparison with that according to the Apex system, whereby the diaphragm value is kept same while other values are considered as negative values and respectively indicated with Ev', Tv', Bv' and Iv'. Hereby instead of the relation according to APEX, the following relation is fulfilled.

−Ev' = Av − Tv'
= −Bv' − Sv'
= −Iv' − Sv'
Tv' = Av + Bv' + Sv'

According to thus converted relations, Tv' is determined as the sum of all the other indexes (in case the diaphragm is set with priority), while Av is determined by counting down the conditions of the light from outside or of the film from Tv' (in case the shutter is set with priority).

Below an exposure computation is made by means of the converted relations. When for example, the diaphragm is 2.8 (Av = 3), ASA 100 (Sv = 5), Ev 10, the luminance B 32 (Bv = 5), Bv' = 9, Sv' = 7, Ev' = Bv' + Sv' = 16 and Av = 3, so that Tv' = Av + Ev' = 19. The relation Tv' = 19 is to indicate 1/125 sec. as shutter time. Thus according to the computation system by means of the exposure computation system by means of the exposure computation circuit according to the present invention, the accomodation to the camera becomes very easy. For example, it is sufficient to so design that three pulses are produced, when the diaphragm is set from 1.0 to 2.8, Sv' of ASA 100 corresponds to seven pulses, Bv' 9 of the luminance of the light beam means B(fL) to be 32 and nine pulses and altogether nineteen pulses give out the shutter speed of 1/125 sec. Although B is increased and Bv' is reduced for example down to 6, if six pulses are produced when the diaphragm is set down to 8, the sum is 19 pulses whereby the shutter speed of 1/125 sec. is resulted. Hereby it goes without saying that the shutter speed varies accordingly when the sum of the total impulses changes. As to how to produce shutter pulses in case of the table shown in FIG. 2, it is sufficient to set in such a manner that no operation takes place up to the 15th pulse and the 16th pulse gives the shutter speed of 1/1000 sec., the 17th pulse that of 1/500 sec. and so on, because the pulse number for Tv' is chosen above 16 or that a necessary number of pulses are produced at a certain determined time set on a built in storage circuit. So far is the explanation as to the relations. The operation of the camera equipped with the circuit according to the present invention will be explained below. The pulses produced in the standard pulse generator (1), when the main switch (10) is closed enters into the input light beam converted (2), in which the input light beam is converted into pulses proportional to its logarithm. The pulses are given to one (U) of the terminals of the up-down-counter (6) by means of an OR gate (11) and a switching over switch (4) in functional engagement with a switch by means of which the shutter speed in priority is switched over into the diaphragm in priority or vice versa. On the other hand, the ASA converting circuit (3), which receives the pulses from the standard pulse generator (1) produces a number corresponding to the ASA value, of pulses, which pulses are given to the terminal (U) as in the above mentioned case. Hereby in case of the diaphragm in priority for example, the pulses are counted together with the counts for the diaphragm preset on the preset switch (5). As the result Tv' ( = Bv' + Sv' + Av) is considered to have entered into the up-down-counter (6). In consequence, the shutter time is indicated in the indication device (7) in the above mentioned state. When the shutter button is now pushed down the diaphragm is closed down to the preset value. After a mechanical delay after the raise of the mirror the shutter switch (9) is closed, when at the same time, the shutter is opened. At the same time one pulse is produced by means of the storage circuit every time, when the number of the counts reaches a certain value which corresponds to the shutter time, whereby the pulse is given to the other terminal (D) of the up-down-counter (6) in such a manner that in case of the above mentioned embodiment the up-down-counter (6) becomes empty when 19 pulses have entered into it, when the shutter is closed by means of the output coming from the terminal (B) so as to obtain a certain determined exposure time.

So far the case with the diaphragm in priority is explained, while in case of the shutter in priority, the preset Tv' enters into the up-down-counter (6) from the preset switch (5) and Bv' and Sv' are led to the terminal (D) by means of the switching over switch (4) in such a manner that the diaphragm value is indicated in the indication circuit (7) and the diaphragm is closed down to the pulse number indicated by pushing the shutter button. Further, the operation of the shutter in priority can be achieved by leading the Tv' value in the preset switch (5) into the up-down-counter (6) so as to operate the shutter after the raise of the mirror, only after the signal that the up-down-counter (6) becomes empty.

Figure 4:
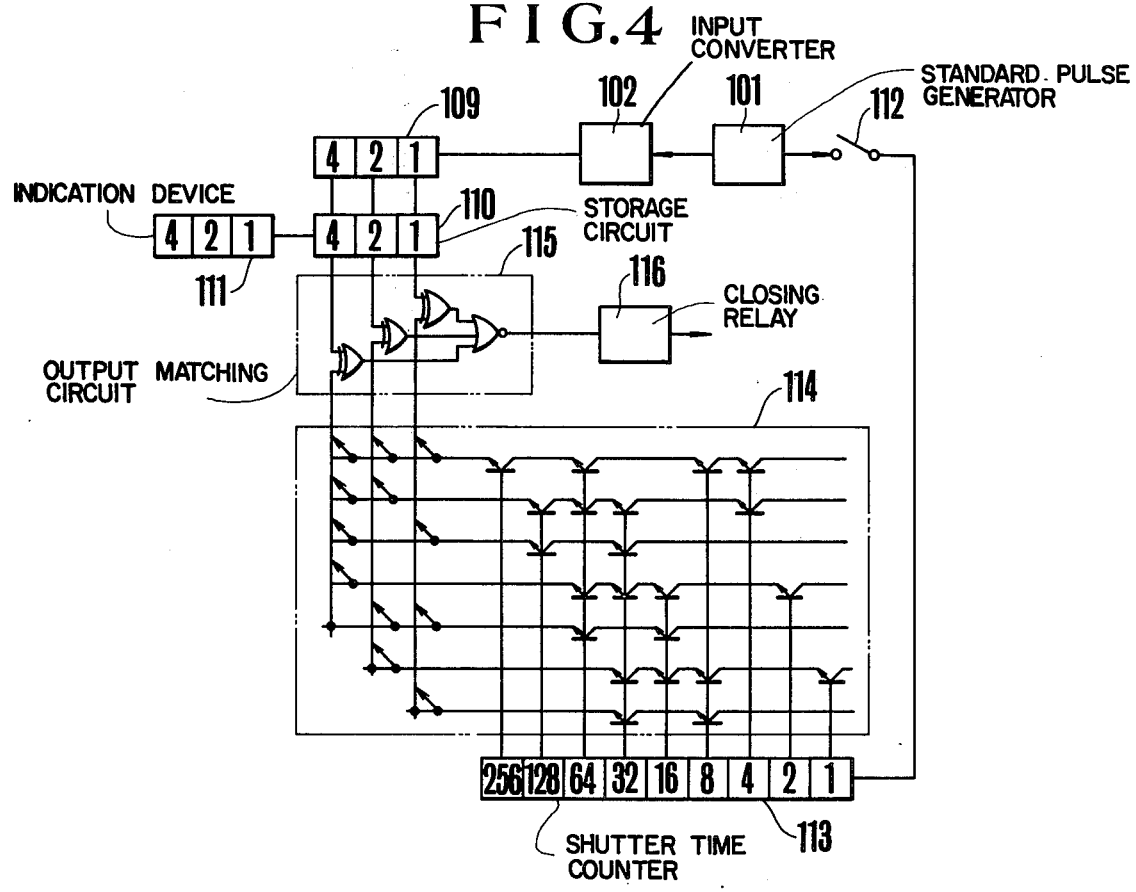
FIG. 4 shows a diagram of a digital circuit as embodiment of the present invention.
Figure 5:
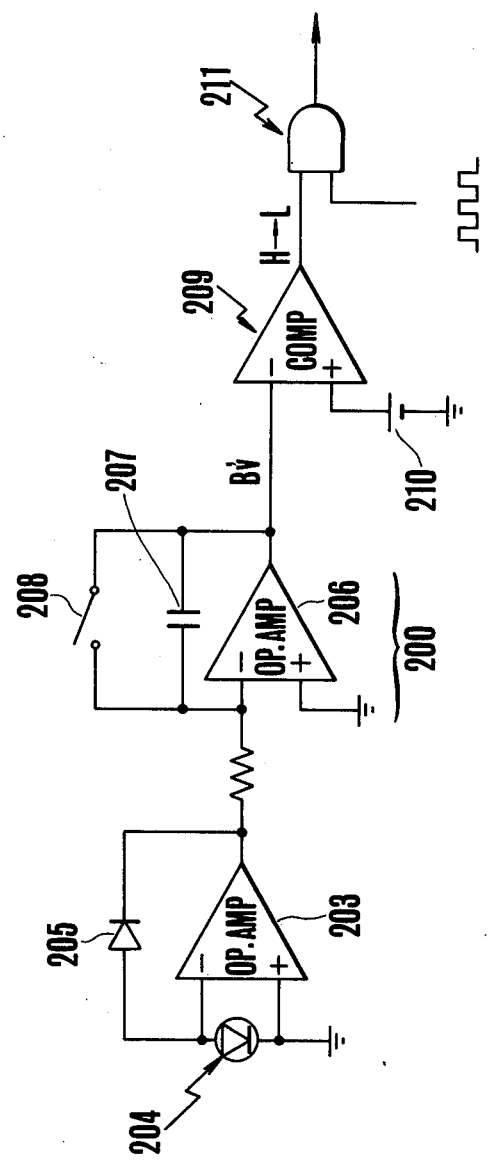
FIG. 5 shows a part of the circuit diagram shown in FIG. 4, in detail.

FIG. 4 shows a circuit diagram of the further other embodiment of the present invention, whereby (101) is a standard pulse generator for continuously generating short pulses at a certain determined period and (102) an input converter presenting a disposition as shown for example, in FIG. 5, by means of the computation amplifier (203), the light receiving elements (204) and the logarithmic diode (205) of which input converter the input light is converted logarithmically by means of the photoelectric effect whereby the photoelectrically converted output is integrated by means of the integrating circuit (200) consisting of a condensor (207) and a computation amplifier (206) together with the switching off operation of a switch (208) in functional engagement with the switching on operation of the main switch not shown in the drawing. (209) is a comparator whose negative input terminal is connected with the output terminal of the above mentioned integrating circuit and whose positive input terminal is connected with a standard voltage presenting a value of the sum of Av and Sv', whereby Av is a logarithmically compressed diaphragm value while Sv' is a value inversely proportional to the logarithmically compressed ASA value. (211) is an AND-gate which is connected with the output terminal of the comparator (209) and that of the above mentioned pulse generator (101). (109) is a computation counter which is connected with the output terminal of the AND-gate (211), whereby the computation counter (109) is connected with the storage circuit (110). (111) is an indication device for indicating the information stored in the storage circuit. (112) is a switch which closes when a shutter button not shown in the drawing, is pushed, (113) a shutter time counter and (114) a comparison circuit of matrix disposition for relating the pulse number counted by means of the shutter time counter (113) to that counted by means of the above mentioned computation counter according to a certain predetermined relation. (115) is an output matching circuit for detecting the matching of the pulse signal coming from the comparison circuit with that coming from the above mentioned storage circuit, whereby the output signal is led to the shutter closing relay (116) when the above mentioned both pulse signals are matched with each other.

FIG. 6 shows a table of the example of the shutter speed, the computation pulse and the pulse number for shutter speed for explaining the embodiment shown in FIG. 4.

Below the operation of the exposure computation circuit according to the present invention shown in FIGS. 4 and 5 will be explained. When the main switch not shown in the drawing is closed, the switch (208) is opened in functional engagement with the main switch. On the other hand, the light receiving element (204) produces a voltage which corresponds to the input light beam, which voltage is logarithmically compressed by means of the logarithmic diode (205) and the computation amplifier (203) and led to the negative input terminal of the integrating circuit (200). The above mentioned logarithmically compressed voltage is integrated by means of the integrating circuit (200) and led to the negative input terminal of the comparator (209). At the positive input terminal of the comparator (209) exists a standard voltage corresponding to a value of the sum of $A_T$ and Sv' which voltage is compared with the voltage at the negative terminal of the comparator (209). The voltage to be led to the negative input terminal of the comparator (209) varies proportionally to the input light beam so that when the input light beam is strong enough the standard voltage is reached in a short time, while the input light beam is weak it takes longer time to reach the standard time. When the both input values of the comparator (209) are matched with each other, the comparator does not operate any more and does not produce the output to be led to the one input terminal of the AND-gate. In consequence, the AND-gate (211) does not operate any more. Because the AND-gate is connected with the standard pulse generator (101), the pulse signals pass through the AND-gate (211) until the comparator (209) stops its operation. As explained above, the time until the comparator (209) ceases its operation is inversely proportional to the logarithmically compressed value of the input light beam so that the number of the pulses having passed through the AND-gate (211) assumes a value which corresponds to Tv' ( = Bv' + Sv' + Av). The pulses having passed through the AND-gate (211) are led to the computation counter (109) and counted binarily in such a manner that the counts (Tv') are stored in the storage circuit (110). (111) is the indication device for the information stored in the storage circuit. The above mentioned operations are finished only by aiming the object to be photographed with a camera, whose shutter button has not yet been pushed. On the other hand, the shutter opening switch (112) is closed when the shutter button is pushed in such a manner that the standard pulses produced in the standard pulse generator (101) are led to the shutter time counter (113) and counted in it. This counting time is to present an actual time in unit of the period of the standard pulses.

The comparison circuit (114) in the present embodiment is of the matrix disposition, which relates the computation counts to the shutter time counts according to a certain predetermined relation so as to detect the time points at which the shutter time counts reach certain determined counts in such a manner that the counts corresponding to the computation counts can be obtained as output at each time point whereby this output and the output of the above mentioned storage circuit (110) are compared by means of the output matching circuit (115) consisting of a non-match gate and a NOR-gate so as to detect the outputs matched with each other in such a manner by means of this pulse the shutter closing relay (116) is operated so as to close the shutter in a certain predetermined time.

The actual circuit diagram shown in FIG. 4 is the one in case seven steps of the shutter speeds are provided whereby one step corresponds to $2^n$ and the computation pulse number corresponding to each shutter speed and the shutter time pulse number are as shown in FIG. 6. The repetition period of the standard pulse used as the shutter time pulse here is 50μ sec. (Frequency: 20 KHz). As to other information corrections necessary for taking photograph, it is so set that the pulse number be O when ASA is 100 and the computation pulse number be 5 basing upon the EV value and the diaphragm value. In such a case as mentioned above. the digit of the first and the fourth figure of the computation counter becomes a logic "1", whereby in the storage circuit "101" in binary system is stored as Tv' value. The shutter speed of 1/125 corresponding to 5 of the computation pulses is 8 ms. The counts of the shutter time counter corresponding to this time is 160 of pulses of 50 μs and the figure of 128 and 32 of the counter becomes logic "1", whereby in the shutter time counter (113), "010100000" in binary system is counted. The third gate-circuit counted from the above of the comparison matrix (114) on the drawing is switched on in such a manner that "101" is led to the output matching circuit (115). Namely the shutter is closed when the shutter time count reaches "010100000" in such a manner that an exposure of 1/125 sec. is obtained.

Further in case of the embodiment shown in FIG. 4, the value inversely proportional to the logarithm of the luminance of the object to be photographed and that of the film sensibility are used as input information, while if the values corresponding to these exposure factors are used the shutter time control can be carried out in the actual time, when the comparison circuit is set so as to present a certain determined comparison relation to the values corresponding to the above mentioned exposure factors.

FIG. 7 shows a table of the dimensions corresponding to the shutter speed of each step in case the range of the shutter time is 1/2000 to 8 seconds. There are two series in the shutter speeds, namely 1/2000 series of $2^n$ series and 1/1400 of $2^n$ series. When the greatest common divisor is taken into consideration, the standard period is 25 μs and the pulse number of this frequency becomes the pulse number of the shutter counter. 1/60 instead of 1/62.5 is taken for the shutter time twice as large as 1/125 in a series of $2^n$ and 1/60 is calculated into the pulse number, taking 25 μs as standard. In this case, a circuit similar to that shown in FIG. 4 using the computation counter of five figures and the shutter time counter of nineteen figures. In case a certain degree of error is allowed, the count can be made with only 2 - 3 digits in the upper range of the shutter time counter and in this way, the gate of the comparison circuit (114) can be made much more simple.

Figure 8:
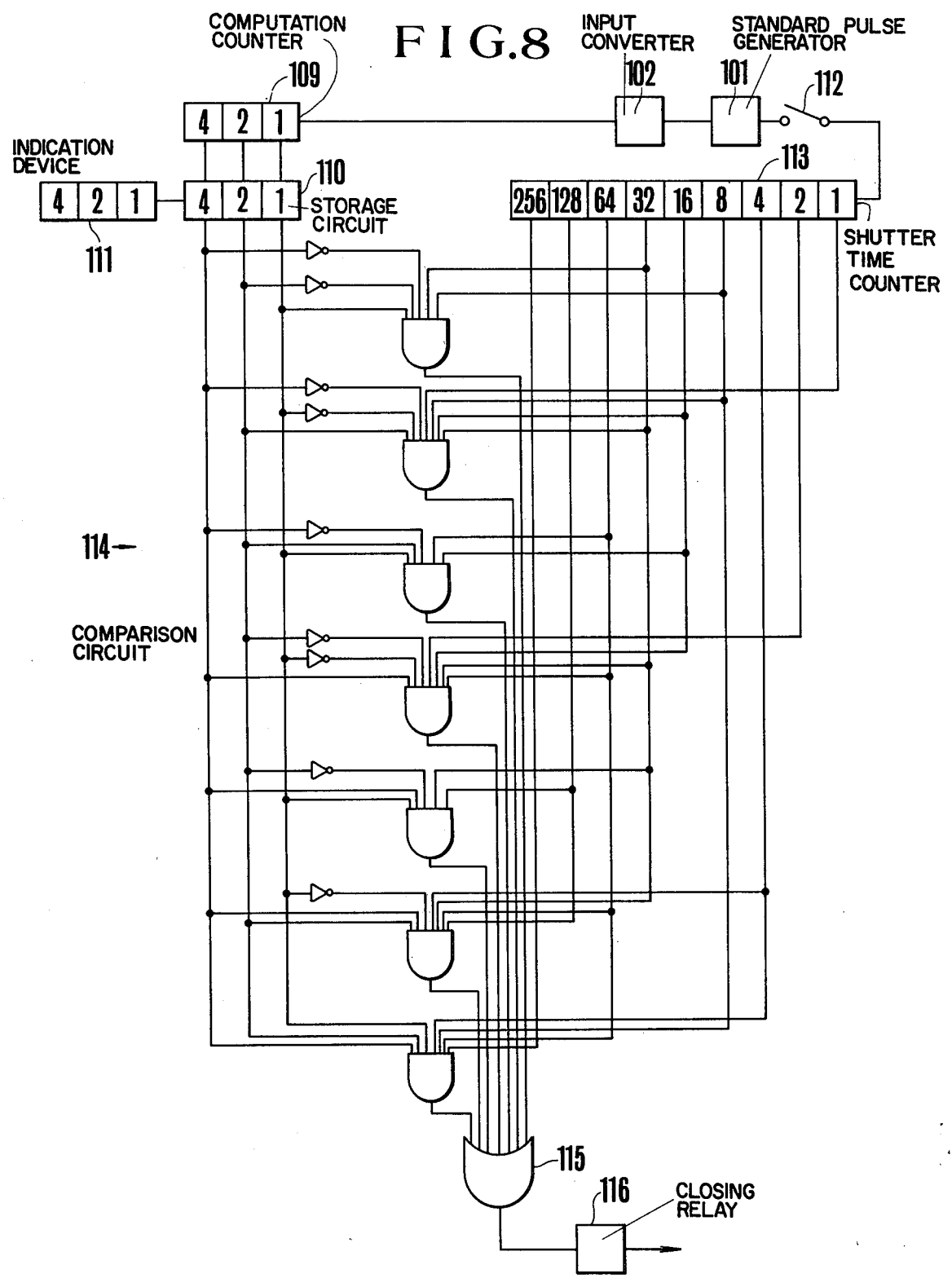
FIGS. 8 and 9 show respectively a further embodiment of the present invention.
Figure 9:
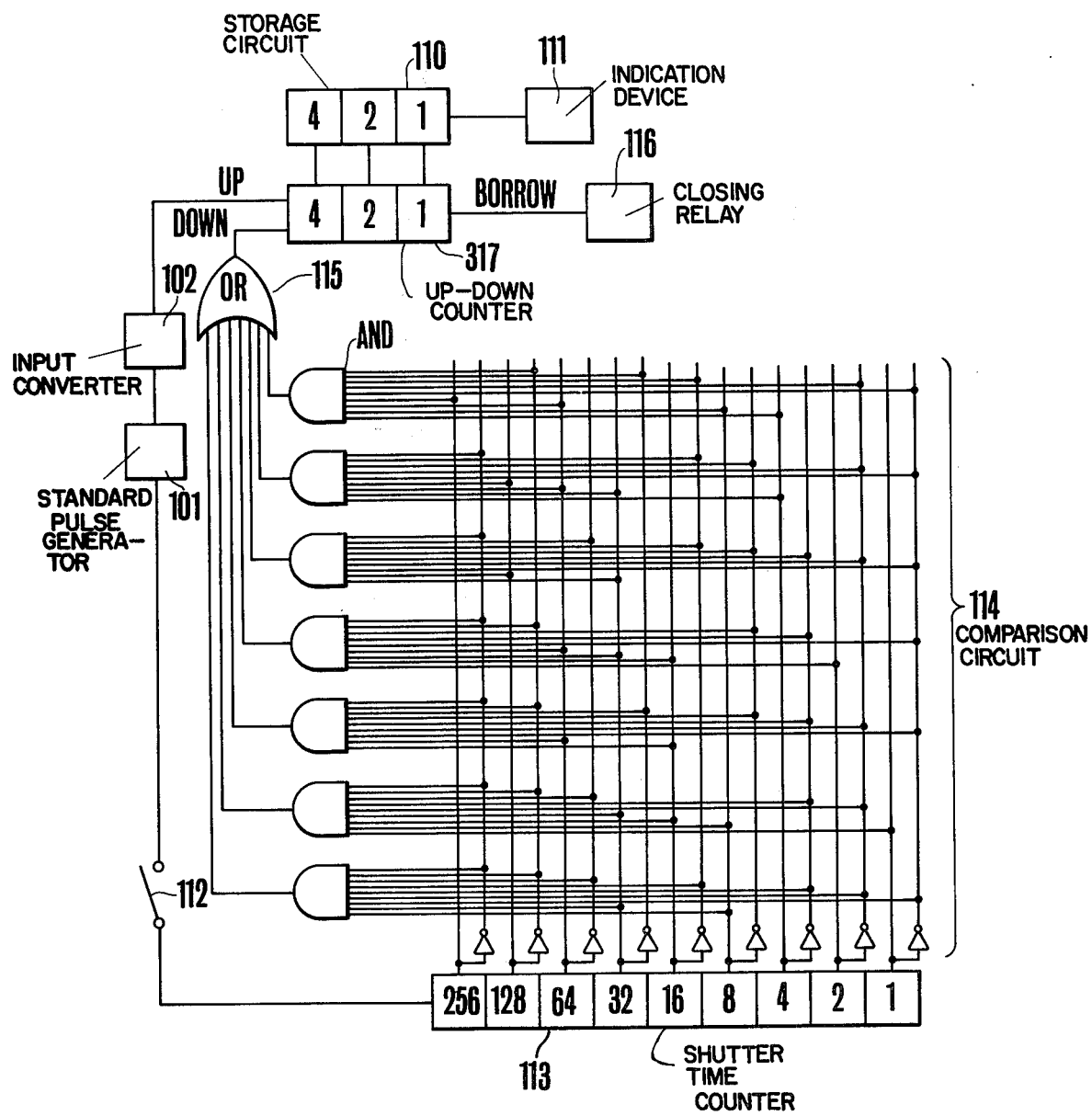

FIGS. 8 and 9 show a further other embodiment of the present invention. The parts presenting the same effect as those in FIG. 1 are provided the same numerical figures. In case of the comparison circuit (114) shown in FIG. 8, the computation count (stored in the storage circuit (110) corresponding to the shutter speed and the count of the shutter time counter are compared with each other by means of an AND-gate, whereby the counts for the faster shutter speed are compared one after another so as to detect the match point and are used to operate the shutter closing relay through the output matching circuit or the NOR-gate in the present embodiment. In FIG. 9. a up-down-counter (317) is used computation counter to which the output of the input converter (102) is led, whereby every time when the output of the shutter time counter (113) is matched with each shutter speed one pulse is produced by the AND-gate and used to reduce the counts through an OR-gate in such a manner that at a certain predetermined shutter speed the counter (117) becomes empty and produces an output by means of which the shutter closing relay is operated so as to obtain a certain predetermined exposure.

As explained above in the exposure computation circuit according to the present invention, the relations as to the exposure factors of the APEX system is improved in such a manner that the computation is carried out using values inversely proportional to the logarithms of all the exposure factors excepting the diaphragm and by giving the shutter time value (Tv') or the diaphragm value (Av) as the result of computation relation proportional to the actual shutter speed value or the actual diaphragm value the control can be carried out with the actual shutter speed or the actual diaphragm value. In consequence, in case the computation and the control are carried out digitally it is possible to convert the input analog-digitally and compress the input logarithmically so as to reduce the number of the computation figure, to carry out the computation with the reduced figure number and to treat the actual time, when enlarging the computation result into the time, whereby the time can directly obtained digitally without using the digital-analog conversion. In consequence, it is possible to realize not only a circuit disposition suitable for the digital computation but also $2^n$ series, $2^n$ series and other series freely besides the $2^n$ series. Further, as to the reduction of the computation time, in case the range of the shutter time is 1/2000 to 8 seconds, at least it takes 8 ms generally even if the compression of 1/1000 is taken into consideration, whereby a frequency more than 2 MHz is necessary as the upper frequency limit, while according to the present invention, for example, a frequency of 40 KHz - 80 KHz already suffices as standard frequency, whereby even if 40 KHz is taken up as standard frequency and the number of the steps of speed is 30, a time less than 0.8 ms already suffices for carrying out computation. Hereby the more the frequency is increased the shorter the time needed for computation can be made. Hereby it is very profitable to be able to choose the combination freely depending upon other conditions. Thus the exposure computation circuit according to the present invention offers remarkable effects.

What is claimed is:
1. An exposure computation system comprising:
   (a) a first conversion means for converting the intensity of light into pulses of a number inversely proportional to the logarithm of the intensity of light;
   (b) a first counter for counting the pulses from said first conversion means and generating a first digital output corresponding to the number of pulses counted thereby;
   (c) a pulse generating means for generating pulses at a fixed period;
   (d) a second counter for counting pulses from said pulse generating means and generating a second digital output corresponding to the number of pulses counted thereby;
   (e) a second conversion means coupled to said second counter to convert the second digital output of the second counter to a third digital output inversely proportional to the logarithm of said second digital output;
   (f) comparison means for comparing said first digital output and third digital output and generating a signal when said first digital output and third digital output have achieved a predetermined relationship; and
   (g) a shutter control means, for placing a shutter in an opened state from the start of the counting of said second counter until a signal is generated by said comparison means and closing the shutter corresponding to a signal of said comparison means.

2. An exposure computation system according to claim 1, in which said first conversion means contains a light measuring circuit to generate voltage proportional to the logarithmic value of an object brightness and a gate circuit to conduct ON-OFF control of a gate based on the output voltage of said light measuring circuit, and said pulse generator being connected to said gate circuit to pass pulses when the gate circuit is ON.

3. An exposure computation system according to claim 1, wherein
said first conversion means contains a light measuring circuit to generate voltage proportional to the logarithmic value of an object brightness;
an integration circuit to integrate the output of said light measuring circuit and to generate an integration output which varies with time in proportion to the output of said light measuring circuit;
a reference voltage means to output a prescribed reference voltage;
a comparison means to compare the output of said integration circuit and said reference voltage for generating an output when both outputs have a predetermined relation with each other; and
gate means coupled to said pulse generator, to said gate means closing a gate in response to the output of said comparison means 4. An exposure computation system according to claim 3, in which said integration circuit is a Miller integrator.

5. An exposure computation system comprising:
(a) a light measuring means for measuring the intensity of the light and generating a first electric signal inversely proportional to the logarithm of the intensity of the light;
(b) a film speed value conversion means for converting the film speed value into a second electric signal inversely proportional to the logarithm of the film speed value;
(c) a diaphragm value conversion means for converting the diaphragm value into a third electric signal proportional to the logarithm of the diaphragm value;
(d) a pulse generator for generating pulses at a fixed period;
(e) A gate circuit, which opens its gate based on the output of said light measuring means, the output of said film speed value conversion means and the output of said diaphragm conversion means, to control the number of pulses from said generator passing therethrough;
(f) a first counter for counting the pulses through said gate circuit;
(g) a second counter for counting said pulse generated by said pulse generating means;
(h) a conversion circuit for convering the number of pulses counted by second counter into a number of pulses proportional to the logarithm of the number of pulses counted by second counter;
(i) a matching detection circuit, which detects the number of pulses counted by said first counter and the number of pulses from said conversion circuit and generates an output signal when the two pulse ambients have achieved a prescribed relationship; and
(j) a shutter control means, for placing a shutter in an opened state starting from the counting of said second counter until a signal is generated by said matching detection circuit and closes the shutter in response to the signal of said matching means.

6. An exposure system for a camera comprising:
(a) first conversion means for converting the intensity of light into a first digital value corresponding to the logarithm of the intensity of light;
(b) memory means for memorizing the first digital value;
(c) pulse generating means for generating pulses for a fixed period;
(d) counter means for counting the pulses from said pulse generating means and generating a second digital output corresponding to the number of pulses counted thereby;
(e) second conversion means coupled to the counter means to convert the second digital output of the counter means to a third digital output corresponding to the logarithm of said second digital output;
(f) comparison means for comparing said first and third digital outputs and generating a signal when said first digital output and third digital output have achieved a predetermined relationship; and
(g) shutter control means to close a shutter in response to the signal from said comparison means.

* * * * *